US011237770B2

(12) United States Patent
Hotta et al.

(10) Patent No.: US 11,237,770 B2
(45) Date of Patent: Feb. 1, 2022

(54) STORAGE SYSTEM AND QUEUE CONTROL METHOD OF STORAGE SYSTEM

(71) Applicant: Hitachi, Ltd., Tokyo (JP)

(72) Inventors: Reoto Hotta, Tokyo (JP); Yuta Kajiwara, Tokyo (JP); Naoki Sakamoto, Tokyo (JP); Kosuke Komikado, Tokyo (JP); Shinjiro Shiraki, Tokyo (JP); Hirokazu Ishii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/029,309

(22) Filed: Sep. 23, 2020

(65) Prior Publication Data

US 2021/0191659 A1 Jun. 24, 2021

(30) Foreign Application Priority Data

Dec. 23, 2019 (JP) ............................ JP2019-231925

(51) Int. Cl.
*G06F 3/06* (2006.01)

(52) U.S. Cl.
CPC ........... *G06F 3/0659* (2013.01); *G06F 3/061* (2013.01); *G06F 3/0673* (2013.01)

(58) Field of Classification Search
CPC ...... G06F 3/061; G06F 3/0659; G06F 3/0673; G06F 3/0689
See application file for complete search history.

(56) References Cited

U.S. PATENT DOCUMENTS 6,952,424 B1 * 10/2005 Bass ...................... H04L 49/90 370/412

* cited by examiner

*Primary Examiner* — Yong J Choe
(74) *Attorney, Agent, or Firm* — Mattingly & Malur, PC

(57) ABSTRACT

A protocol chip stores requests from a computer in a port queue, on the basis of an index indicating a slot of the port queue which allows subsequent storing. MPs each hold a CI of the slot having undergone a preceding search of the port queue by the MP, search this port queue from the slot that the pointer indicates, search for a request addressed to a logical device to which the MP corresponds, and store this request in a virtual queue corresponding to the logical device, to process the request.

9 Claims, 17 Drawing Sheets

STORAGE SYSTEM AND QUEUE CONTROL METHOD OF STORAGE SYSTEM

CROSS-REFERENCE TO PRIOR APPLICATION

This application relates to and claim the benefit of priority from Japanese Patent Application No. 2019-231925 filed on Dec. 23, 2019 the entire disclosure of which is incorporated herein by reference.

BACKGROUND

The present invention relates to a storage system and a queue control method of the storage system.

High-performance storage systems have a great number of processors or processor cores, in order to perform high-speed processing of requests received from host computation apparatuses via higher-order interfaces.

In the storage system, the processors frequently perform polling of higher-order interfaces, in order to reap requests received from the host computation apparatus at high speed. Such a request reaping mechanism by polling is configured of queues that exist corresponding to the higher-order interfaces, a device that stores request received from the higher-order interfaces in the queues, and processing performed by processors that reap requests from the queues.

In this configuration, all processors perform polling of each of the higher-order interfaces, thereby avoiding loads being concentrated on particular processor cores, and enabling the processing capabilities of the storage system to be maximized. Now, if a plurality of processors simultaneously perform polling of a particular higher-order interface, this can cause trouble such as a single request that has been received being processed redundantly by a plurality of processors, inconsistency occurring in queue management information, and so forth. Accordingly, a method is generally applied where each higher-order interface is provided with a lock, and the processors perform polling of the higher-order interfaces while excluding other processors by acquiring locks.

Some requests that host computation apparatuses send to the storage system expect that the storage system will sequentially process the requests in accordance with the order of sending. The storage system needs a framework to ensure that the order in which the series of requests is processed will match the order of receipt. Ensuring that the order that the host computation apparatus expects is realized here in certain logical increments such as, for example, a request group where a particular logical device within the storage system is the destination, a request group passing through a particular connection in a network configured between the host computation apparatus and the storage system, and so forth.

An example of technology where a plurality of processors perform polling of particular higher-order interface devices while excluding other processors by a locking mechanism, and also perform processing of requests received from the host while maintaining the order of receipt in particular logical increments is described in Japanese Patent Application Publication No. 2018-180985.

In the information processing apparatus disclosed in Japanese Patent Application Publication No. 2018-180985, a request acquisition unit has a plurality of CPU cores that exclusively perform processing of acquiring processing request stored in a request queue in the order of storage, and allocating serial numbers thereto. A sorting unit reorders the processing requests acquired by the CPU cores in order of the serial numbers. A soft request queue management unit stores the processing requests in a soft request queue in the order reordered by the sorting unit. A processing execution unit acquires processing requests from the soft request queue in the order stored by the soft request queue management unit, and performs processing in accordance with the acquired processing requests.

In a case where the processing capabilities of each processor is uniform, the time required for processing of processors reaping requests from queues (i.e., the length of time of exclusion among processors by locking) is also uniform, as a matter of course. Accordingly, even if a great number of processors or processor cores are installed to improve the processing capabilities of the storage system, the efficiency of the storage system reaping requests from a certain higher-order interface will never exceed the inverse of the time. That is to say, the mechanism such as described in Japanese Patent Application Publication No. 2018-180985 has problems in application to a storage system having a configuration where there is a logical performance ceiling value, and the number of processors that can access individual higher-order interfaces is markedly great.

The present invention has been made in light of the above-described problem, and it is an object thereof to provide a method where, in a configuration in which a plurality of processors share a particular higher-order interface and perform polling, requests are reaped in parallel without performing exclusion among the processors, and processing is performed while maintaining the order of receipt of the requests within a range of an optional logical increment to which received requests belong.

SUMMARY

In order to solve the above problem, a storage system according to an aspect of the present invention includes: a plurality of logical devices; an I/O controller configured to accept, from a computer, one or more requests specifying any one or more of the plurality of logical devices; and a controller configured to perform processing of the requests with regard to the plurality of logical devices, on a basis of the requests, wherein the controller includes a plurality of processors provided corresponding to the plurality of logical devices, and memory, wherein the memory includes a port queue having slots where a predetermined number of the requests are stored, and virtual queues provided corresponding to the plurality of logical devices, wherein the I/O controller is configured to store the requests from the computer in the port queue, on a basis of an index indicating a slot of the slots which allows subsequent storing, wherein the processors are each configured to hold pointers of the slots having undergone a preceding search of the port queue by the processors, search this port queue from the slots that the pointers indicate, search for the requests addressed to the respective logical devices to which the processors correspond, and store the requests in the virtual queues corresponding to the logical devices, to process the requests.

According to the present invention, exclusion among processors is made unnecessary in polling control of higher-order interfaces, whereby the processor cores can reap requests in parallel with high efficiency and perform processing while maintaining the order of receipt thereof.

Other objects, configurations, and advantages will become apparent from the following description of embodiments for carrying out the invention.

DETAILED DESCRIPTION OF THE EMBODIMENT

Figure 1:
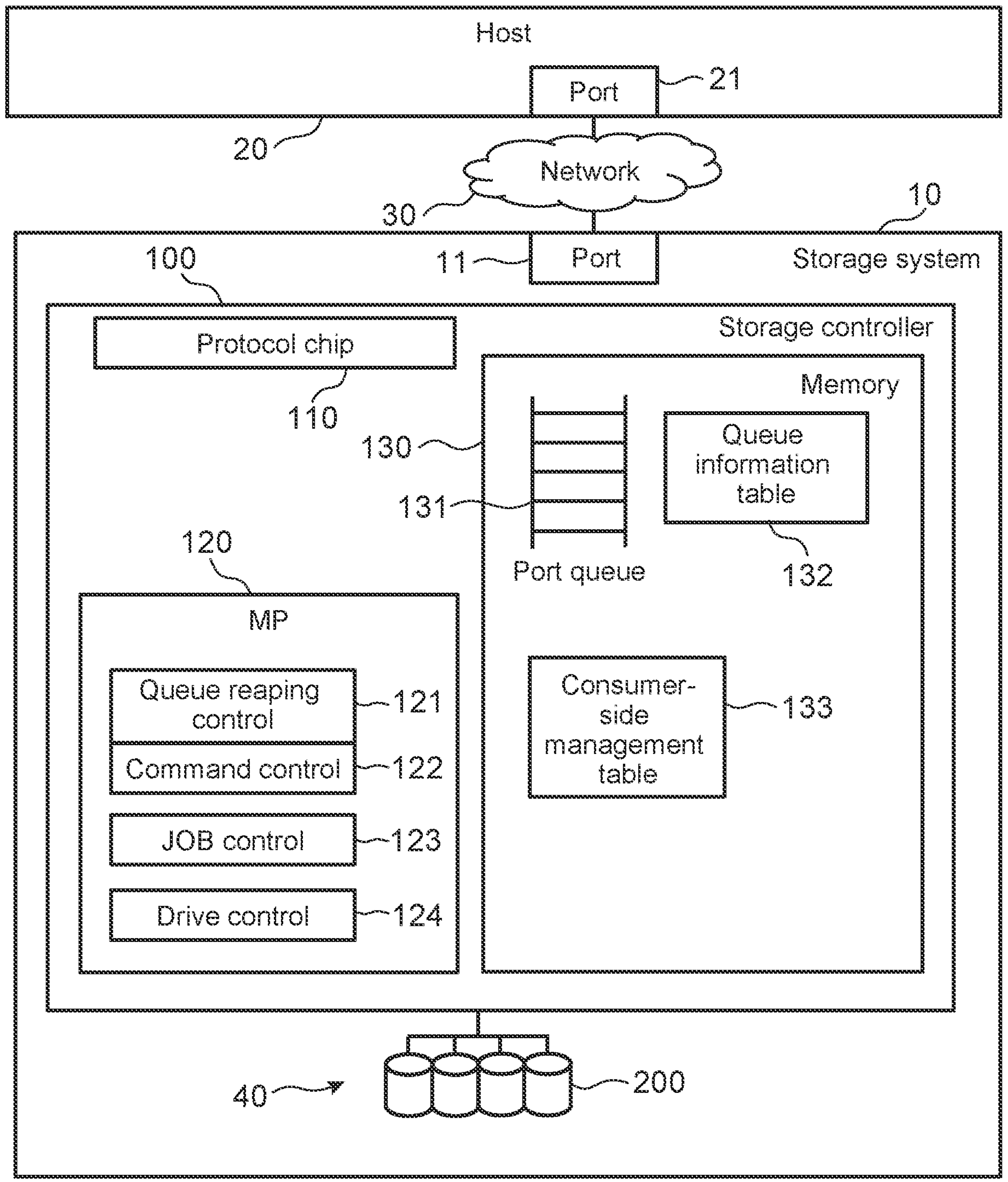
FIG. 1 is a diagram illustrating a functional configuration of a storage system according to an embodiment.

An embodiment of the present invention will be described below with reference to the Figures. The following description and Figures are an exemplification for description of the present invention, with omissions and simplifications being made as appropriate to clarify the description. The present invention can be carried out by various other embodiments as well. The components may be singular or a plurality, unless limited in particular.

Note that in the figures for describing the embodiment, portions having the same function are denoted by the same symbols, and repetitive description thereof will be omitted.

The positions, sizes, shapes, ranges, and so forth, of the components illustrated in the Figures may not reflect the actual positions, sizes, shapes, ranges, and so forth, in order to facilitate understanding of the invention. Accordingly, the present invention is not necessarily limited to the positions, sizes, shapes, ranges, and so forth, disclosed in the Figures.

Although various types of information may be described using expressions such as “table”, “list”, “queue”, and so forth in the description below, the various types of information may be expressed by other data structures. “XX table”, “XX list”, and so forth may be referred to as “XX information”, to indicate non-dependence on a data structure. Expressions such as “identification information”, “identifier”, “name”, “ID”, “No.”, and so forth may be used in description of identification information, and these may be used interchangeably.

In cases where there is a plurality of components having the same or similar functions, the same symbols may be appended with different suffixes for description. However, in cases where there is no need to distinguish among the plurality of components, the suffixes may be omitted in the description.

In the following description “MP” is one or more processors. The at least one processor typically is a microprocessor such as a CPU (Central Processing Unit), but may be a different type of processor, such as a GPU (Graphics Processing Unit). The at least one processor may be single-core or may be multicore.

Also, at least one MP may be a processor in a broader sense, such as a hardware circuit that performs part or all of the processing (e.g., an FPGA (Field-Programmable Gate Array) or ASIC (Application Specific Integrated Circuit)).

Also, there are cases where description will be made below regarding processing performed by executing a program, but the entity carrying out the processing may be the MP, since a program carries out predetermined processing by appropriately using storage resources (e.g., memory) and/or interface devices (e.g., a communication port) and so forth, by being executed by the MP (e.g., CPU, GPU). In the same way, the entity carrying out the processing performed by executing a program may be a controller, apparatus, system, computer, or node, that has a processor. It is sufficient for the entity carrying out the processing performed by executing a program to be a computing unit, and may include a dedicated circuit that performs particular processing (e.g., an FPGA or ASIC).

In the following description, an “interface unit” may be one or more interfaces. The one or more interfaces may be one or more of the same type of communication interface device (e.g., one or more NIC (Network Interface Card)), or may be two or more different types of communication interface devices (e.g., an NIC and HBA (Host Bus Adapter)).

Also, in the following description, a “memory unit” may be one or more memory devices, and typically may be a main storage device. At least one memory device in a memory unit may be volatile memory or may be nonvolatile memory.

A program may be installed into an apparatus such as a computer, from a program source. The program source may be a program distribution server or a computer-readable storage medium, for example. In a case where the program source is a program distribution server, the program distribution server may include a processor and storage resources for storing the program to be distributed, with the processor of the program distribution server distributing the program that is the object of distribution to another computer. Further, in the following description, two or more programs may be realized as one program, and one program may be realized as two or more programs.

In the present disclosure, the storage device includes a storage drive such as an SSD (Solid State Drive) or the like.

Terms used in the present specification will be described below.

Port queue: a queue structure that the storage system creates in increments of ports coupling to a network; requests received via each port are consecutively stored in slots in a port queue corresponding to the port, with the order of receipt maintained Virtual queue: a queue structure of which a plurality is logically configured within the storage system; one virtual queue corresponds to one logical device, and requests to this logical device are reaped from the port queue and stored in the virtual queue Producer side: the entity of the side storing requests received from a host in the port queue (a protocol chip in the present embodiment)

Consumer side: the entity of the side reaping requests from the port queue (an MP in the present embodiment, with one MP being allocated as a Consumer side assignee for each virtual queue)

PI (Producer Index): a pointer that exists for each port queue, and points to a slot position in the port queue where the Producer side should store an I/O request received next from this port, when the request is received CI (Consumer Index): a pointer that exists for each port queue and each virtual queue combination, and points to a slot in a port queue to serve as a start position when the Consumer side of which the virtual queue is an assignee performs search processing next Done flag: binary information managed corresponding to each slot in a port queue; cleared by the Producer side simultaneously with a new request being stored in a corresponding slot, and configured by the Consumer side simultaneously with the request in the corresponding slot being reaped (in the following description, a state where a done flag has been configured may be referred to as "done")

Cycle No. (cycle #): integer value information managed corresponding to each slot in a port queue; 0 is configured at the time of initializing the port queue, and is incremented by the Producer side each time a request is newly stored in the corresponding slot

First Embodiment

An embodiment will be described below with reference to the Figures.

FIG. 1 is a diagram illustrating a functional configuration of a storage system according to the embodiment.

The storage system 10 according to the embodiment is configured with a host 20 coupled thereto. The storage system 10 and the host 20 are capable of communicating over a network 30 via higher-order interfaces 21 and 11 that have ports. The network 30 is, for example, an FC-SAN (Fibre Channel Storage Area Network) or IP-SAN (Internet Protocol Storage Area Network) or the like. The storage system 10 and the host 20 can exchange information following a particular communication standard over the network 30, this communication standard being, for example, SCSI (Small Computer System Interface) or NVMeoF (Non-Volatile Memory Express over Fabrics) or the like.

The storage system 10 has a storage apparatus 40, and a storage controller 100 coupled to the storage apparatus 40. The storage apparatus 40 has a plurality of logical devices 200.

The storage controller 100 has a protocol chip 110 that processes requests from the host 20 via the higher-order interface 11 and performs various types of control of sending processing results based on this request, MPs 120 of the same number as logical devices 200, the MPs 120 performing operation control of the overall storage system 10, and local memory 130 that temporarily stores storage management information used when the MPs 120 transfer data, write data from the host 20, and read data from the logical device 200, these being mutually connected by an internal bus that is omitted from illustration. An example of contents of a request from the host 20 here may be a query or change regarding attribute or state to the logical device 200, an acquisition, update, or deletion of data accessible from the logical device 200, or interruption of a separate request already sent to the logical device 200. The corelative relation between the logical device 200 and the storage drive included in the storage system 10 may be any corelative relation. Alternatively, the logical device 200 may or may not have a corelative relation with the connection connecting the host 20 and the storage system 10 via the network 30. The host 20 takes the logical device 200 as a logical increment, and expects processing order ensurance within the range thereof.

In the MP 120, a queue reaping control program 121, a command control program 122, a JOB control program 123, and a drive control program 124 operate, whereby the MP 120 realizes the functions set for the respective programs. The programs 121 through 124 are actually stored in the local memory 130, and read from the local memory 130 and executed at the MP 120 as appropriate, but are illustrated as functions that the MP 120 has, from the perspective of being functions of the MP 120.

The queue reaping control program 121 performs port queue reaping operations, which are a feature of the storage system 10 according to the present embodiment.

The local memory 130 stores a port queue 131, a queue information table 132, and a Consumer-side management table 133, as management information.

Next, configuration examples of tables and so forth, which are management information, will be described.

Figure 2:
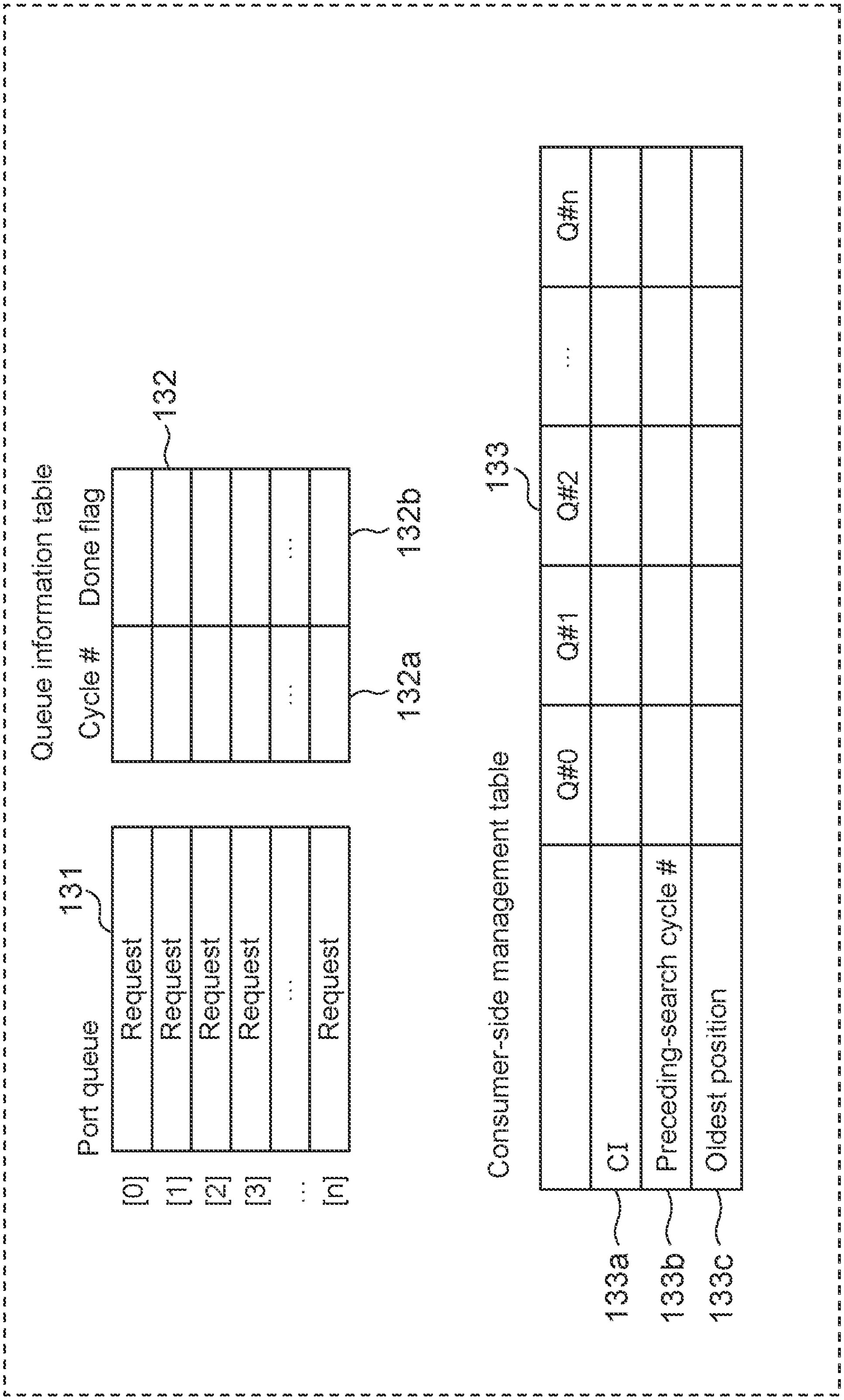
FIG. 2 is a diagram illustrating an example of a configuration of memory of a controller of the storage system according to the embodiment.

FIG. 2 is a diagram illustrating an example of a configuration of the local memory 130 of the storage controller 100 of the storage system 10 according to the embodiment.

The port queue 131 has a plurality of slots ([0] [1] . . . [n] in FIG. 2). Upon receiving requests from a host via the port 11, the protocol chip 110 stores those requests in the order of receipt in the port queue 131 associated with the port, starting with a position that the PI points to, as long as there are empty slots remaining.

The queue information table 132 has the same number of rows as the number of slots of the port queue 131, and a cycle No. (cycle #in FIG. 2) 132*a* and a done flag 132*b* are stored corresponding to each of the slots of the port queue 131.

The Consumer-side management table 133 stores a CI 133*a* corresponding to each of logical devices 200 (Q #0, Q #1, . . . Q #n in FIG. 2), a preceding-search cycle No. 133*b*, and an oldest position 133*c*.

Next, an overview of operations of the storage system 10 according to the present embodiment will be described with reference to FIG. 3.

Figure 3:
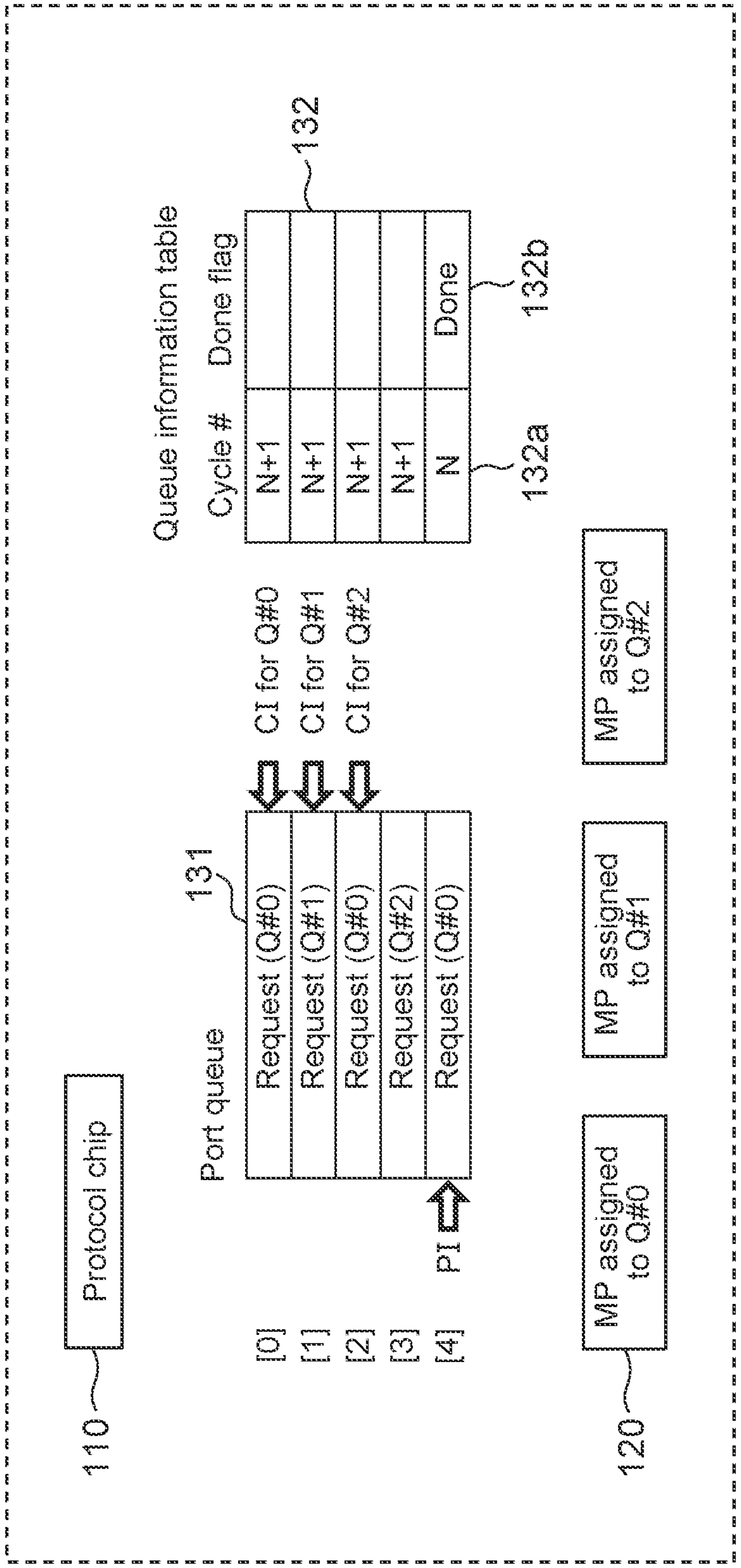
FIG. 3 is a conceptual diagram illustrating an example of operations of the storage system according to the embodiment.

FIG. 3 is a conceptual diagram illustrating an example of operations of the storage system 10 according to the present embodiment.

Requests sent from the host 20 via the port of the higher-order interface 11 are stored in slots of the port queue 131 by the protocol chip 110. The items listed in the slots of the port queue 131 in FIG. 3 are requests, in a format where each request specifies a logical device 200. In the following description, information regarding which logical device 200 each request specifies will be referred to as Q #(a request where Q #n is written is a request addressed to the n'th logical device 200).

In the example illustrated in FIG. 3, four requests are stored in the slots of the port queue 131. Simultaneously with storing the requests in the slots of the port queue 131, the protocol chip 110 updates the PI indicating up to which slot that a request has been stored. The example in FIG. 3 indicates that the PI is at the slot [4].

The MP 120 corresponding to each logical device 200 recognizes the requests that it should reap. As one example, the MP 120 at the far left reaps requests (Q #0).

Each MP 120 searches the slots of the port queue 131 by polling control, and if there is a request Q #that it should reap, reaps the request. The MP 120 then appropriately updates the CI indicating up to which slot has been searched.

The request reaping operations and the CI updating operations of the MPs 120 are independently performed by the respective MPs 120, whereby the respective MPs 120 can perform reaping operations of requests completely in parallel without mutual exclusion.

Next, operations of the storage system 10 according to the present embodiment will be described with reference to FIGS. 5 through 13. Note that the number of slots in the port queue 131 is the four of [0] through [3] in FIGS. 5 through 9, the number of slots in the port queue 131 is the six of [0] through [5] in the later-described FIGS. 4 and 10 through 13, and the number of MPs 120 that reap virtual queues is three (MP0 through MP2), and the number of virtual queues in the storage system 10 is illustrated as being three, but there is no particular limit regarding these numbers.

Figure 5:
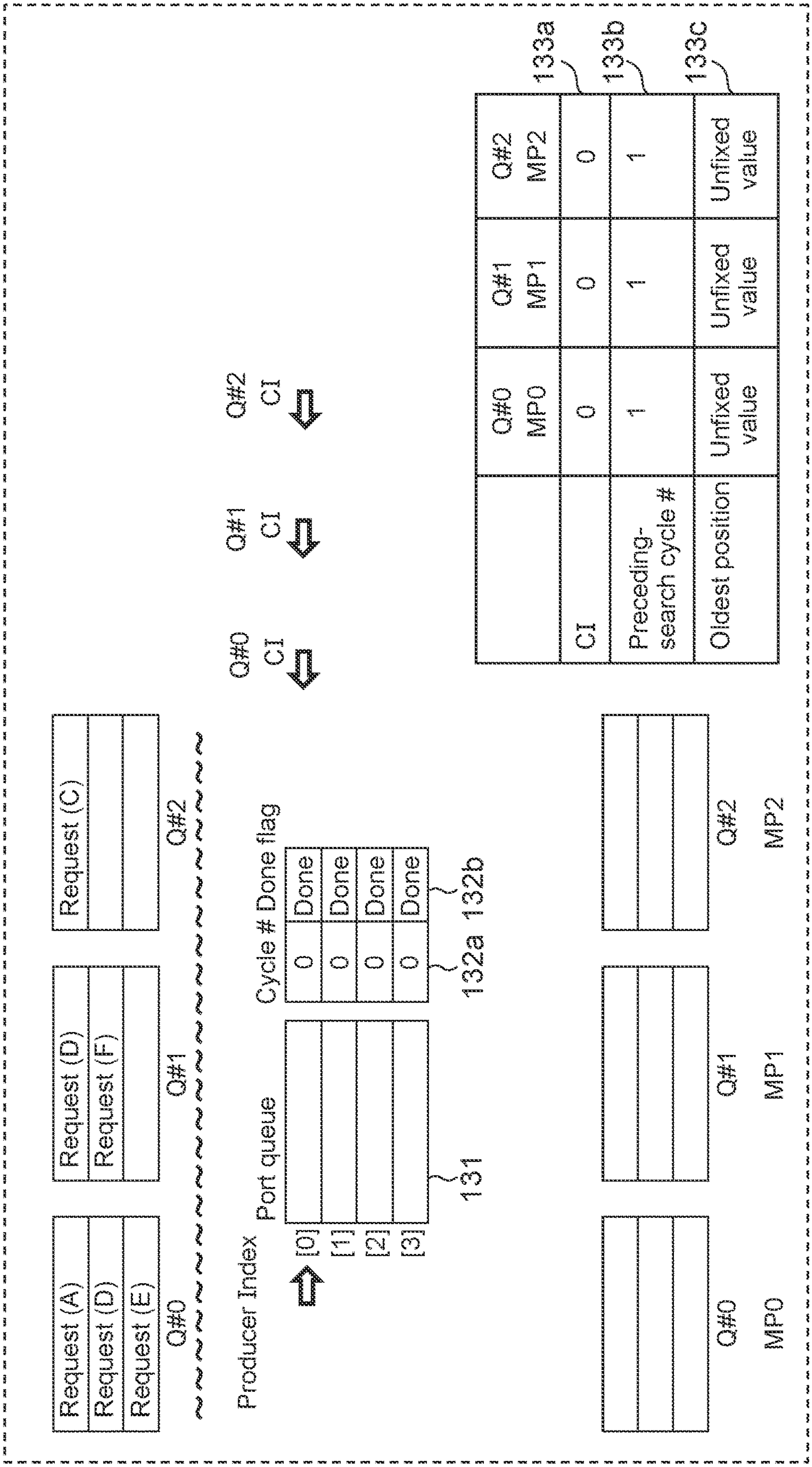
FIG. 5 is a diagram of an example of port queue reaping operations in the storage system according to the embodiment, illustrating a case where the port queue is empty.

FIG. 5 is an example of reaping operations of the port queue 131 by the storage system 10 according to the embodiment, and is a diagram illustrating a state where the port queue 131 is empty. A state where the port queue 131 is empty means a state where there is not a single unreaped request in the entire port queue 131, which can be logically determined by the done flag 132*b* of the queue information table 132 being set to "done" for all slots of the port queue 131.

At the top of FIG. 5 is illustrated virtual queues configured at the host 20 side, illustrating the state of requests being stored in each of the three virtual queues of the host 20. The respective virtual queues are addressed to the three logical devices 200 respectively prepared at the storage system 10 side. The temporal order in which these requests have been sent from the host 20 is indicated by the alphabetic characters. Here, A is the earliest in time, and F is the latest in time. Note that there is no need for the host 20 to actually configure virtual queues as illustrated at the top in FIG. 5, and processing at the storage system 10 side in the present embodiment can be realized regardless of the kind of framework used within the host 20 to manage requests sent to the storage system 10.

The PI of the port queue 131 is at the position of slot [0], and in the same way, the CI search pointers of the respective MPs 120 #0 through #2 are at the position of slot [0]. The cycle No. 132*a* of the queue information table 132 is the initial value 0 for all, and the done flag 132*b* is also the initial value "done" for all. In the same way, the CI 133*a* in the Consumer-side management table 133 is a value indicating slot [0] as well. The preceding-search cycle No. 133*b* is configured to the initial value of 1. The reason is to prevent transitioning to an overtake determination routine of the CI 133*a* at the first time, which will be described later.

Figure 6:
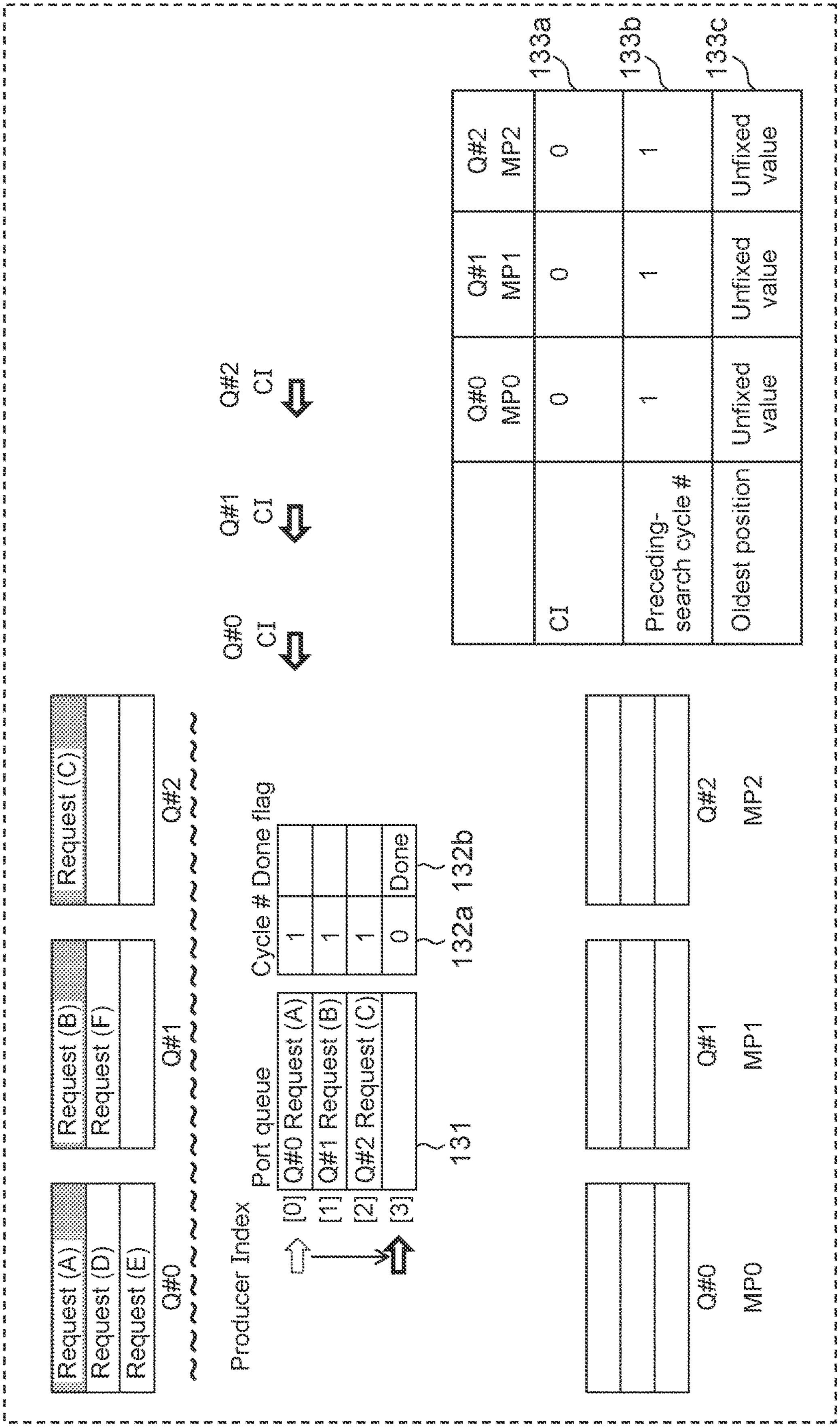
FIG. 6 is a diagram of an example of port queue reaping operations in the storage system according to the embodiment, illustrating operations of storing requests in the port queue.

FIG. 6 is an example of reaping operations of the port queue 131 by the storage system 10 according to the embodiment, and is a diagram illustrating operations of storing requests in the port queue 131.

Requests that the host 20 has sent via the network 30 are stored in slots of the port queue 131 of the storage controller 100 of the storage system 10. In the example in FIG. 6, requests A through C are transmitted to the storage system 10 out of the requests at the host 20 side. Accordingly, three requests are stored in the slots of the port queue 131.

Due to requests being stored in the slots [0] through [2] of the port queue 131, the protocol chip 110 updates the PI to slot [3]. In conjunction with this, the cells in the cycle No. 132*a* of the queue information table 132 corresponding to the slots [0] through [2] are rewritten to 1. In the same way, the done flags 132*b* of the cells in the queue information table 132 corresponding to the slots [0] through [2] are deleted.

Figure 7:
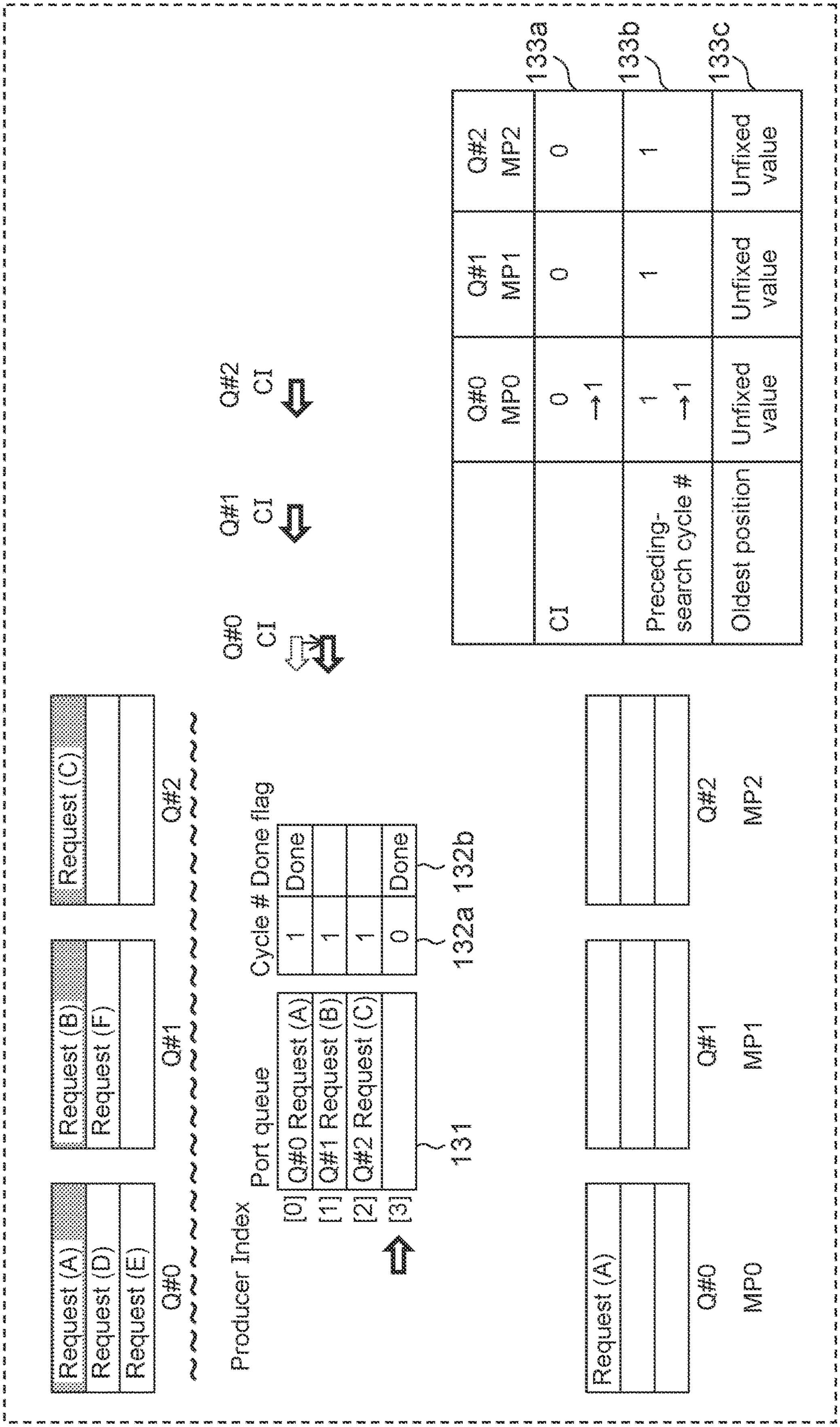
FIG. 7 is a diagram illustrating an example of port queue request reaping operations in the storage system according to the embodiment.

FIG. 7 is a diagram illustrating an example of reaping operations from the port queue 131 in the storage system 10 according to the embodiment.

The MP0 that is assigned virtual queue #0 (Q #0) sequentially searches the slots of the port queue 131 (i.e., from [0] toward [3]) and searches whether or not there is a request for the virtual queue (Q #0) assigned to itself stored in a slot. In the example in FIG. 7, the request of the assigned virtual queue is stored in slot [0].

Accordingly, the MP0 reaps the request in this slot, configures the done flag 132*b* corresponding to the slot "0" in the queue information table 132 to "done", updates the CI 133*a* of the Consumer-side management table 133 by writing 1 thereto. And updates the preceding-search cycle No. 133*b* to 1. Note however, that the initial value of the preceding-search cycle No. 133*b* originally was 1, so substantially there is no updating.

Figure 8:
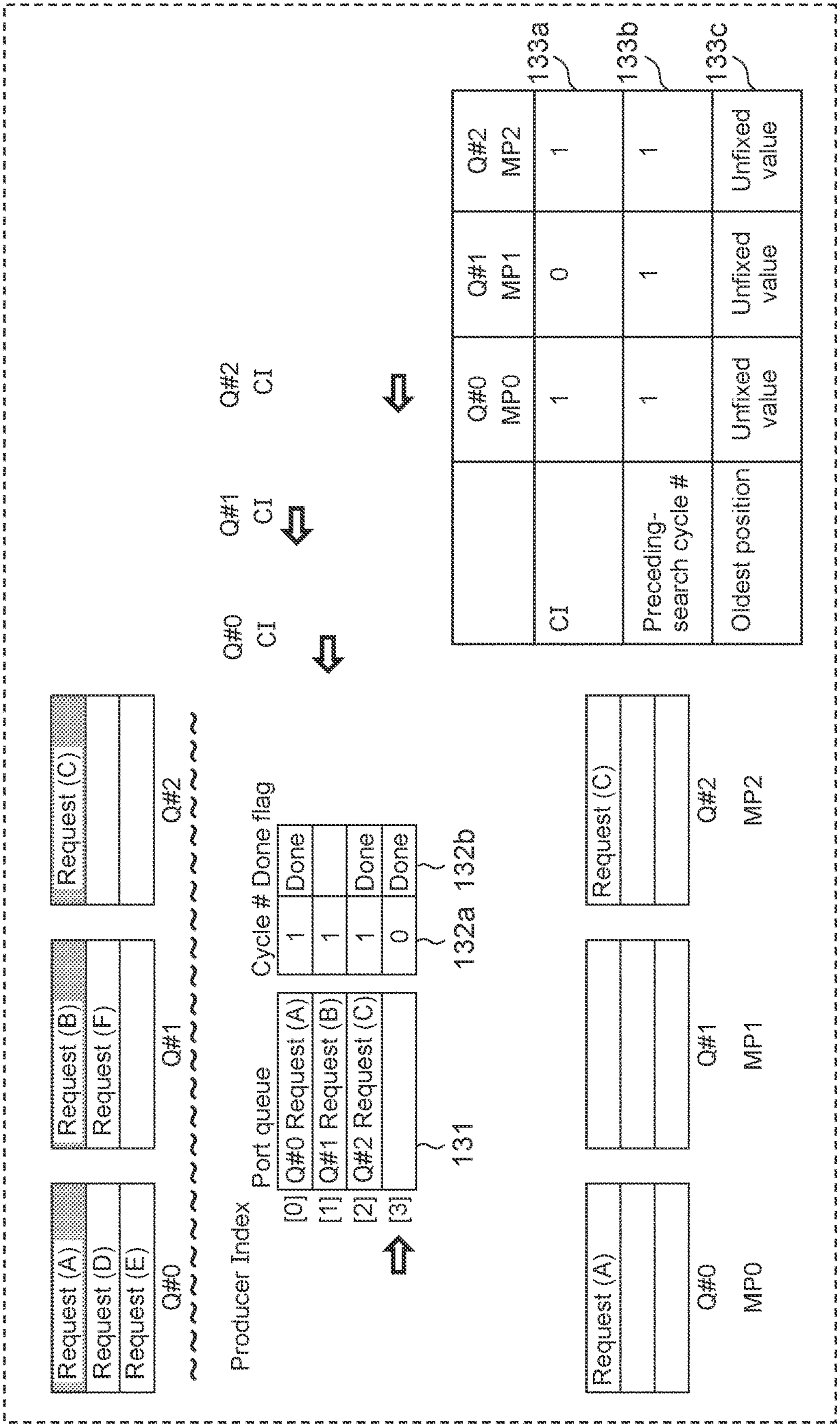
FIG. 8 is a diagram of an example of port queue reaping operations in the storage system according to the embodiment, illustrating an example of a state where unreaped requests remain in the port queue.

FIG. 8 is an example of reaping operations of the port queue 131 of the storage system 10 according to the embodiment, and is a diagram illustrating an example of the port queue where an unreaped request exists.

The MPs 120 each reap the slots of the port queue 131 by polling control. In the case of the example illustrated in FIG. 8, the MP2 also performs a reaping operation of a request to store in the virtual queue (Q #2) to which it is assigned (slot [2]). Meanwhile, the MP1 has gotten off to a late start for reaping operations due to its own circumstances regarding the processing start timing, and has yet to perform slot reaping operations.

Figure 9:
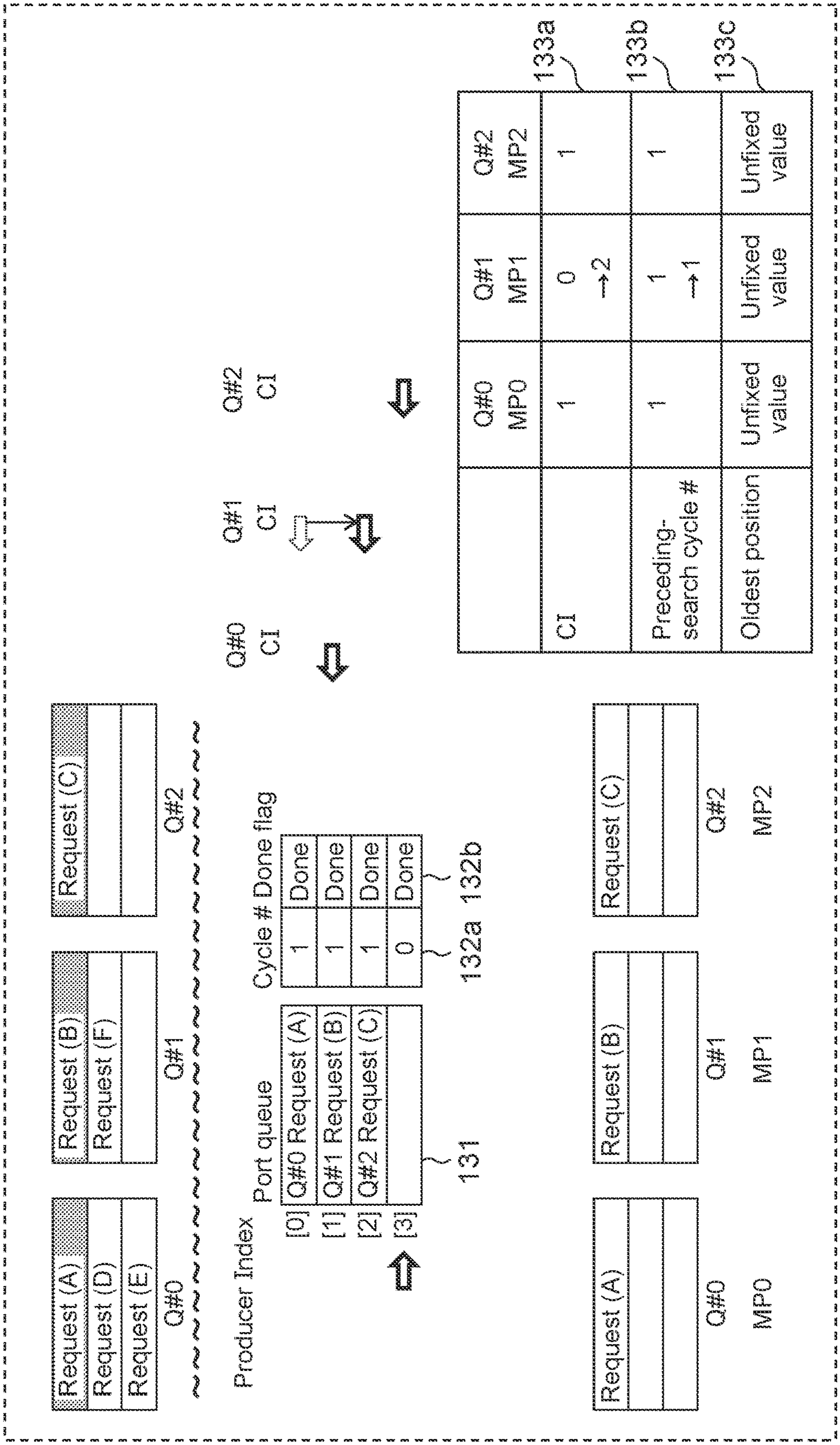
FIG. 9 is a diagram of an example of port queue reaping operations in the storage system according to the embodiment, illustrating another example of a state where unreaped requests remain.

FIG. 9 is an example of reaping operations of the port queue 131 of the storage system 10 according to the embodiment, and is a diagram illustrating another example of a state where an unreaped request exists in the port queue.

The MP1 that had been delayed finally performs a reaping operation of the request stored in the slot [1] of the port queue 131, and thus all cells for the done flag 132*b* in the queue information table 132 are set to "done".

Figure 10:
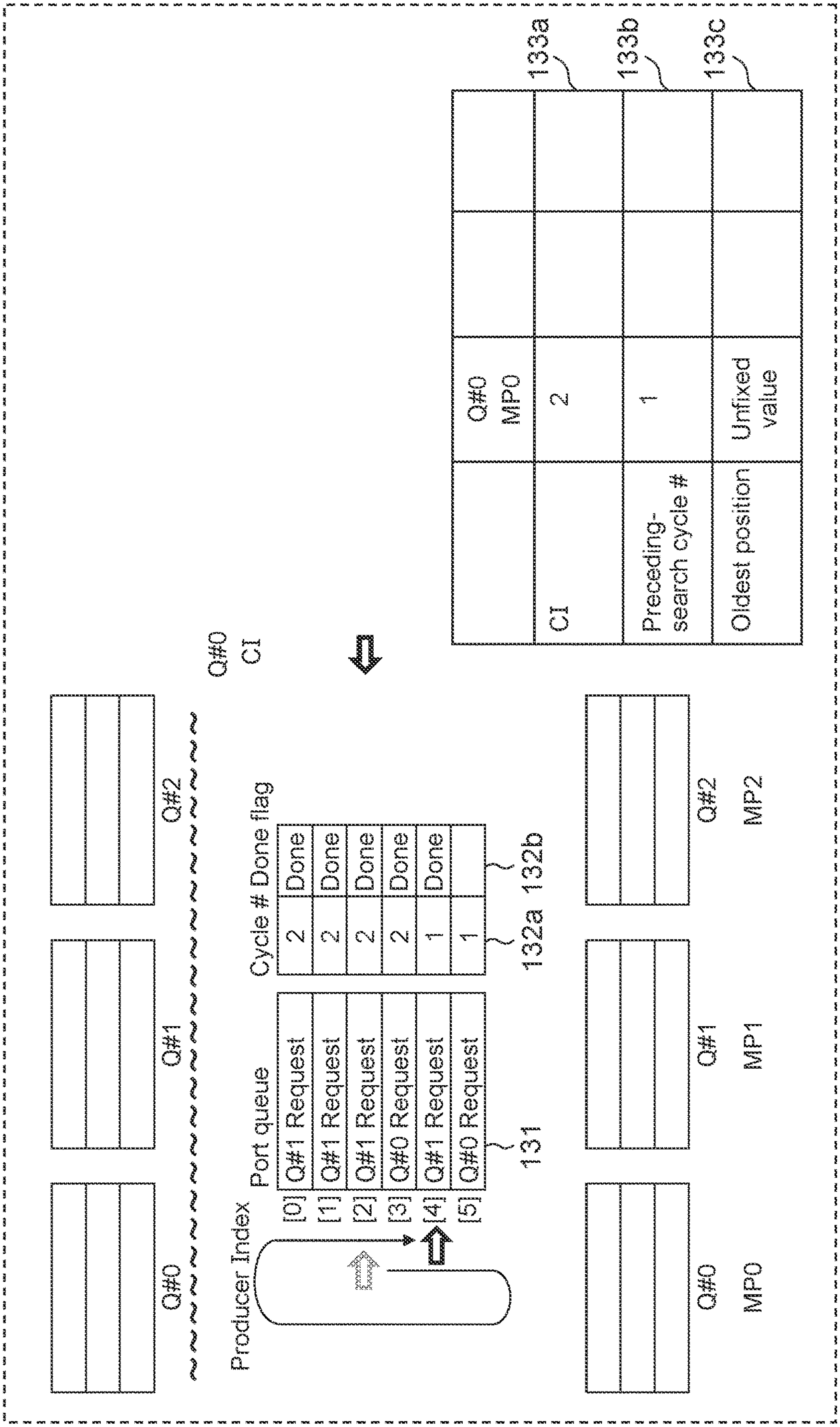
FIG. 10 is a diagram illustrating another example of port queue reaping operations in the storage system according to the embodiment.

FIG. 10 is a diagram illustrating another example of operations of reaping requests from the port queue 131 of the storage system 10 according to the embodiment. Description will be made regarding operations of the MP0 alone in FIGS. 10 through 13, in order to simplify description.

Requests are stored in all slots [0] through [5] of the port queue 131. Also, the CI 133*a* of the MP0 is pointing to slot [2].

The cycle No. 132*a* of the slot [2] to which the CI 133*a* is pointing and the preceding-search cycle No. 133*b* differ, and accordingly the MP0 determines that the PI has overtaken the CI sometime between the preceding request reaping control ending and the current time point, regarding the virtual queue to which it is assigned. Overtaking as used here means that the protocol chip 110 has consecutively stored new requests in the slot that is a newer No. by 1 than the No. of the CI 133*a* of the MP0, and the slot that the CI 133*a* points to. The number of times of overtaking is not limited to one time, and includes states where the PI has overtaken the CI two or more times. In a case where overtaking occurs, unreaped requests for the virtual queue that the MP is assigned to may exist in a range from the slot that the PI points to through the slot that is a newer No. by 1 than the No. of the slot that the CI 133*a* points to (i.e., the entire range of the port queue 131), and is not limited to the range from the slot that the CI 133*a* points to through the slot that is a newer No. by 1 than the No. of the slot that the PI points to.

Accordingly, the MP0 stores a value where 1 is subtracted from the CI (slot [1]) as a tentative end, searches the slots in the port queue 131 forward from the CI [2] to the tentative end [1], searching for whether or not there is a request in a slot for the virtual queue (Q #0) to which the MP0 itself is assigned. As a result of the search, the MP0 discovers that there is a request for Q #0 that it is assigned to in slot [3], but the done flag 132*b* of the queue information table 132 corresponding to this slot is set to "done", and accordingly the MP0 judges that this slot contains a remaining request that has already been reaped as old information, and accordingly disregards this request. Next, the MP0 discovers that there is a request for the virtual queue that it is assigned to in slot [5], for which the done flag 132*b* of the queue information table 132 corresponding to this slot is cleared, and accordingly judges that this is the oldest request in the search range for requests in the virtual queue to which it is assigned. The MP0 deems the request stored in this slot [5] to be an oldest request candidate, and configures this slot to the oldest position 133*c*.

In a case of taking only the processing by the MP0 into consideration, there would be no problem for the MP0 to reap the request in slot [5] and end processing. However, as shown in the following example, the protocol chip 110 is performing request storing processing to the port queue 131 in parallel while the MP0 is performing searching operations, and accordingly, there is a possibility that the position of the PI will further change and that the PI will overtake the CI again. Thus, an oldest request candidate discovered in processing of a single search is not finalized as being the truly oldest request out of the unreaped requests in the virtual queue to which the MP0 is assigned.

Accordingly, the MP0 performs a search of all slots in the port queue again from the oldest slot [5], and checks whether there is a request in the slots storing unreaped requests for the virtual queue regarding to which it is assigned that is older than the oldest request candidate (the corresponding cycle No. 132*a* is smaller and the slot position is a newer No.). As a result, it is found that no request that is older than the oldest request candidate exists, and accordingly the MP0 performs reaping operations regarding the request at the oldest position [5].

Figure 11:
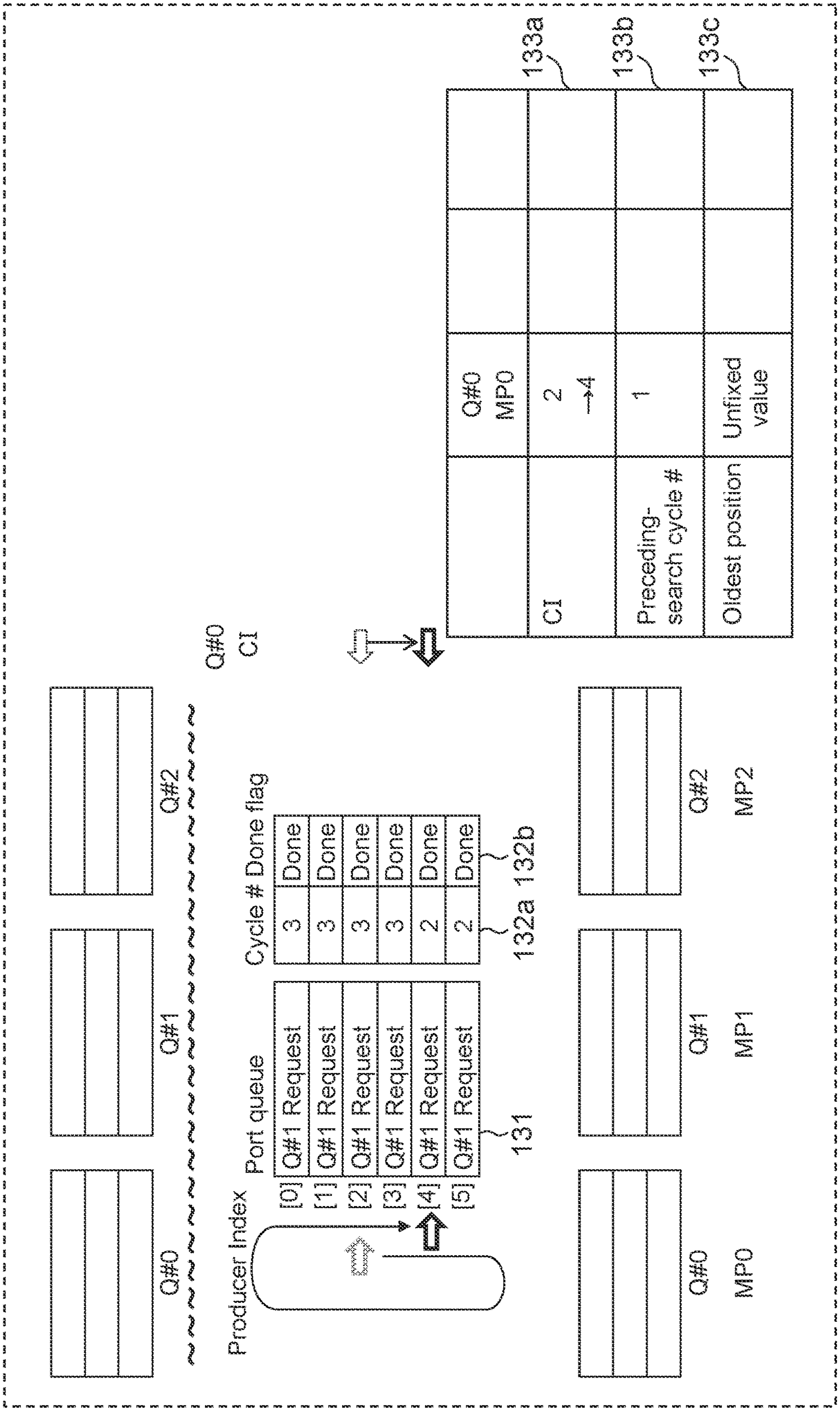
FIG. 11 is a diagram illustrating yet another example of port queue reaping operations in the storage system according to the embodiment.
Figure 12:
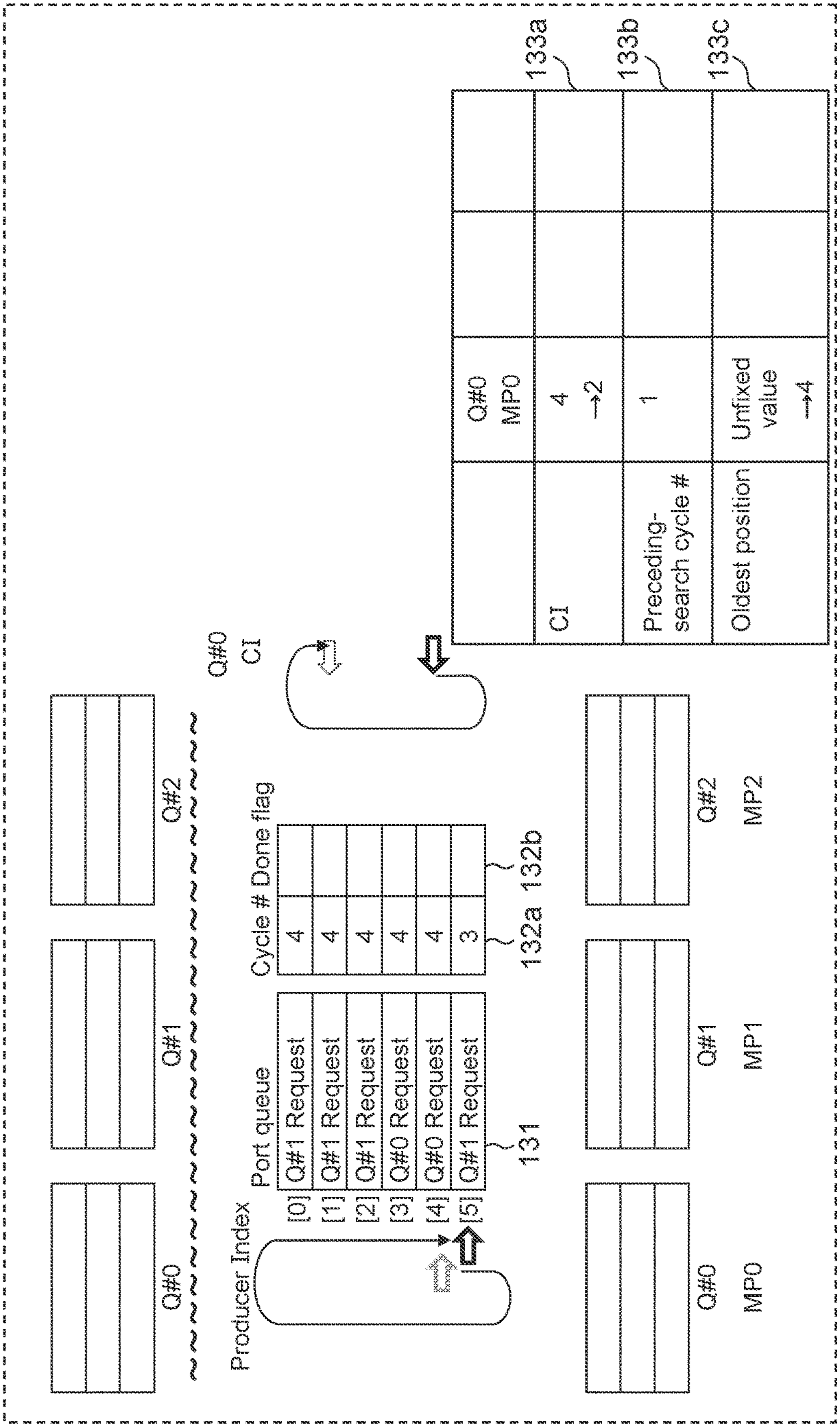
FIG. 12 is a diagram illustrating still another example of port queue reaping operations in the storage system according to the embodiment.
Figure 13:
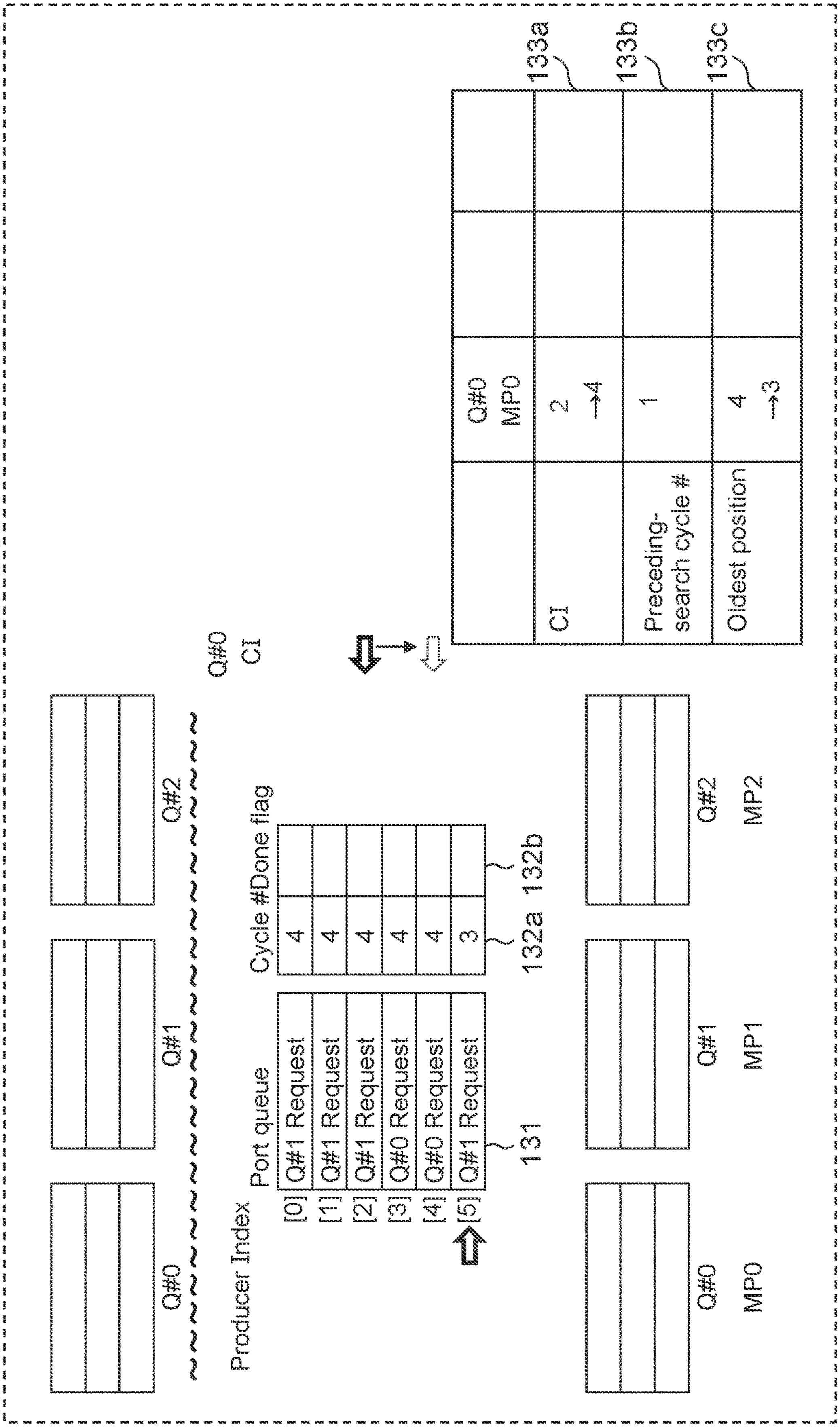
FIG. 13 is a diagram illustrating a further example of port queue reaping operations in the storage system according to the embodiment.

FIGS. 11 through 13 are diagrams illustrating yet another example of operations of reaping from the port queue 131 of the storage system 10 according to the embodiment.

Requests are stored in all slots [0] through [5] of the port queue 131. The CI 133*a* of the MP0 is pointing to slot [2].

The cycle No. 132*a* of the slot [2] to which the CI 133*a* is pointing and the preceding-search cycle No. 133*b* differ, and accordingly the MP0 determines that the PI has overtaken the CI sometime between the preceding request reaping control ending for the virtual queue to which it is assigned, and the current time point.

Accordingly, the MP0 configures a value where 1 is subtracted from the CI (slot [1]) as a tentative end, searches the slots in the port queue 131 forward from the CI [2] for whether or not there is a request for the virtual queue (Q #0) to which it is assigned. A situation will be considered here, where a delay occurs in the processing by the MP0 at the stage of the MP0 advancing the search to slot [4], due to interruption processing or the like.

While processing by the MP0 is stopped, The protocol chip 110 stores requests for Q #0 (which the MP0 is assigned to) in slots [3] and [4] in the port queue 131 (see FIG. 12). If the MP0 resumes slot searching operations in this state, a request for the virtual queue that it is assigned to is stored in slot [4], and the done flag 132*b* in the queue information table 132 corresponding to this slot is cleared, and accordingly the MP0 will judge that this slot is the oldest unreaped request of the requests in the virtual queue that it is assigned to. The MP0 will accordingly decide the request in this slot [4] to be an oldest request candidate, and configure this slot position to the oldest position 133*c*.

However, the oldest position that should actually be searched for is slot [3] as illustrated in the Figures. Accordingly, if a reaping operation is performed for the request stored in slot [4] according to this course, requests can no longer be processed in the order of receipt from the host 20.

Accordingly, the MP0 performs a search of all slots in the port queue again from the slot [4] that is the oldest request candidate, and checks whether there is a request in requests for the virtual queue regarding to which it is assigned that is older than the oldest request candidate (the cycle No. 132*a* corresponding to the stored slot is higher, and the slot position is a newer No.) in the search range. As a result, it is found that the request stored in slot [3] is an older request than the oldest request candidate.

Accordingly, the MP0 determines the request in this slot [3] to be the truly oldest request, copies the request stored in slot [3] to an empty slot in the virtual queue that it is assigned to, sets the CI to 4, which is obtained by adding 1 to this slot position, and updates the oldest position 133*c* to [3].

Next, details of operations of the storage system 10 according to the present embodiment will be described with reference to the flowcharts in FIGS. 14 through 18. Note that in the Figures and the following description, an expression "number of slots" may be used to mean the number of all slots in a port queue of interest. Also, an expression "assigned Q" may be used to mean a virtual queue that the MP 120 is assigned to. Also, an expression "PI slot (or CI slot)" may be used to mean the slot at the position the PI (or CI 133*a* of the assigned Q) is pointing to in the port queue of interest. Also, an expression "PI slot (or CI slot) cycle #" may be used to mean the cycle No. 132*a* in the queue information table 132 corresponding to the PI slot (or CI slot). Also, an expression "PI slot (or CI slot) done flag" may be used to mean the done flag 132*b* in the queue information table 132 corresponding to the PI slot (or CI slot).

Figure 14:
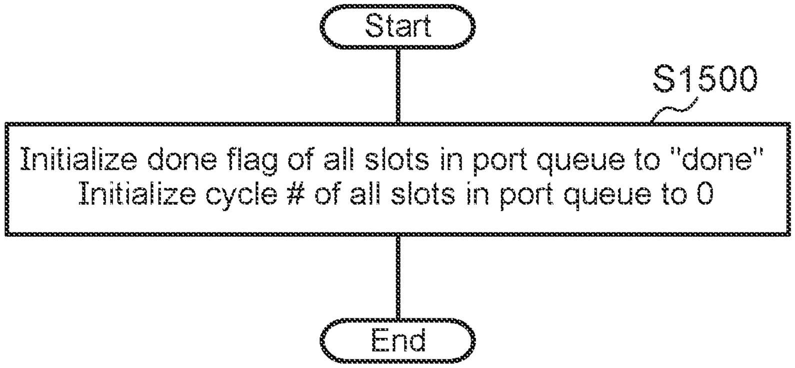
FIG. 14 is a flowchart for describing initial operations of a protocol chip in the storage system according to the embodiment.

FIG. 14 is a flowchart for describing initial operations of the protocol chip 110 in the storage system 10 according to the embodiment. The operations of the flowchart illustrated in FIG. 14 are executed at the time of initial configuration of the storage system 10.

The protocol chip 110 configures the done flag 132*b* in the queue information table 132 corresponding to all slots of the port queue 131 to "done", i.e., sets flags, and further configures the cycle No. 132*a* in the queue information table 132 to all 0 (step S1500).

Figure 15:
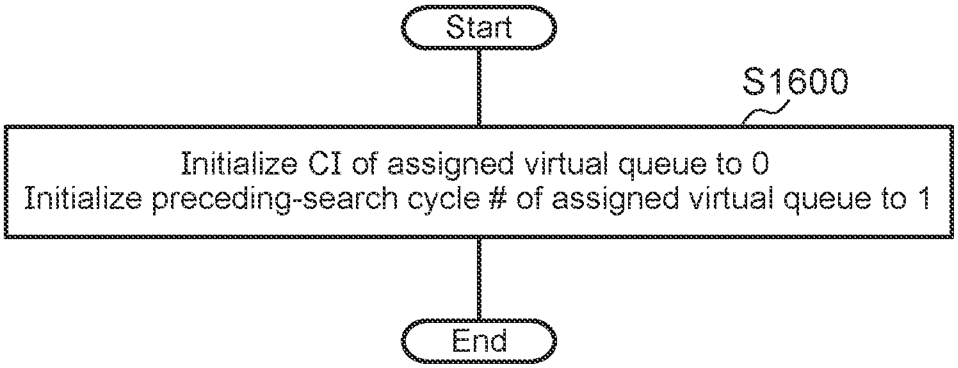
FIG. 15 is a flowchart for describing initial operations of an MP in the storage system according to the embodiment.

FIG. 15 is a flowchart for describing initial operations of the MP 120 in the storage system 10 according to the embodiment. The operations of the flowchart illustrated in FIG. 15 are also executed at the time of initial configuration of the storage system 10.

In the Consumer-side management table 133, the MP 120 configures the CI 133*a* of the column of the MP 120 itself to 0, and configures the preceding-search cycle No. 133*b* to 1 (step S1600).

Figure 16:
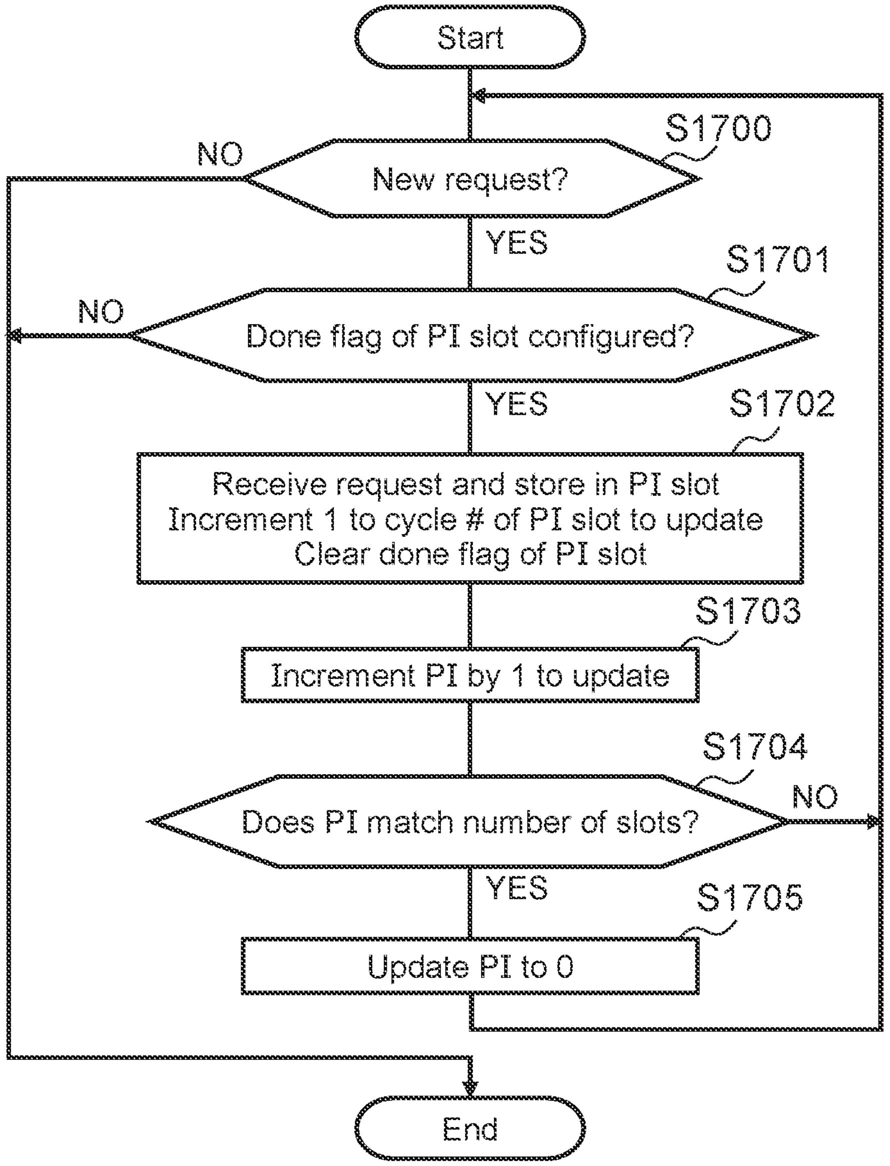
FIG. 16 is a flowchart for describing operations of the protocol chip in the storage system according to the embodiment.

FIG. 16 is a flowchart for describing operations of the protocol chip 110 in the storage system 10 according to the embodiment. The operations illustrated in the flowchart in FIG. 16 are executed as appropriate by polling control.

First, the protocol chip 110 determines whether or not there is a request received at the port of the higher-order interface 21 (step S1700). If the determination is positive (YES in Step S1700), the flow advances to step S1701, and if the determination is negative (NO in Step S1700), the flow ends.

In step S1701, the protocol chip 110 determines whether or not the done flag 132*b* of the queue information table 132 corresponding to the slot that the PI is pointing to is "done". This is processing for checking whether or not there is an empty slot in the port queue 131. If the determination is positive (YES in Step S1701), the flow advances to step S1702, and if the determination is negative (NO in Step S1701), the flow ends.

In step S1702, the protocol chip 110 stores the received request in a slot of the port queue 131 indicated by the PI, increments the value of the cycle No. 132*a* in the queue information table 132 corresponding to the slot that the PI is pointing to by 1, and clears the done flag 132*b*. The protocol chip 110 then increments the value of the PI by 1 (step S1703).

The protocol chip 110 determines whether or not the incremented PI is equal to the number of slots of the port queue 131 (step S1704). If the determination is positive (YES in Step S1704), the protocol chip 110 configures the PI to 0 (step S1705) and the flow returns to step S1700, and if the determination is negative (NO in Step S1704), the flow returns to step S1700.

Figure 17:
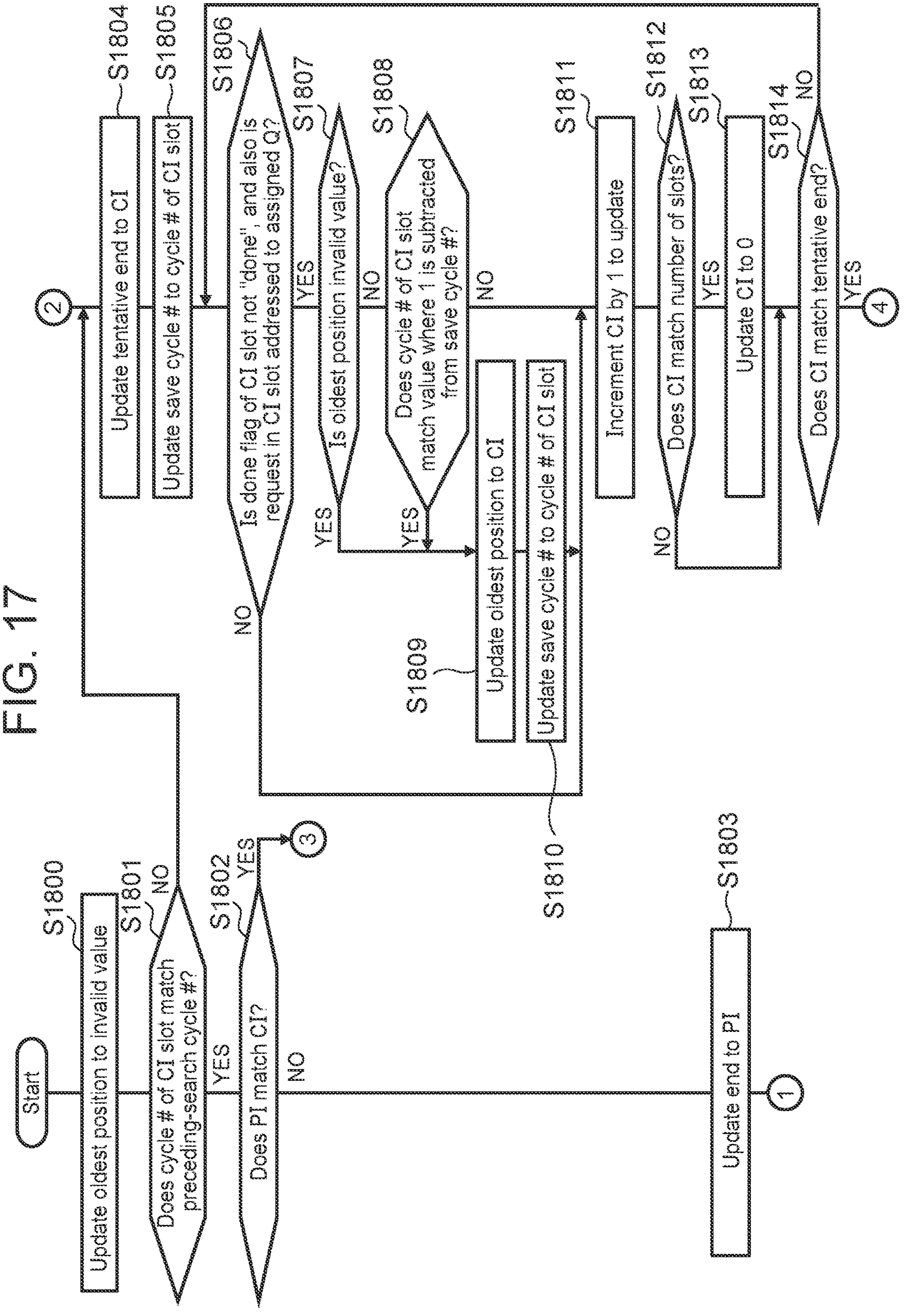
FIG. 17 is a flowchart for describing operations of the MP in the storage system according to the embodiment.
Figure 18:
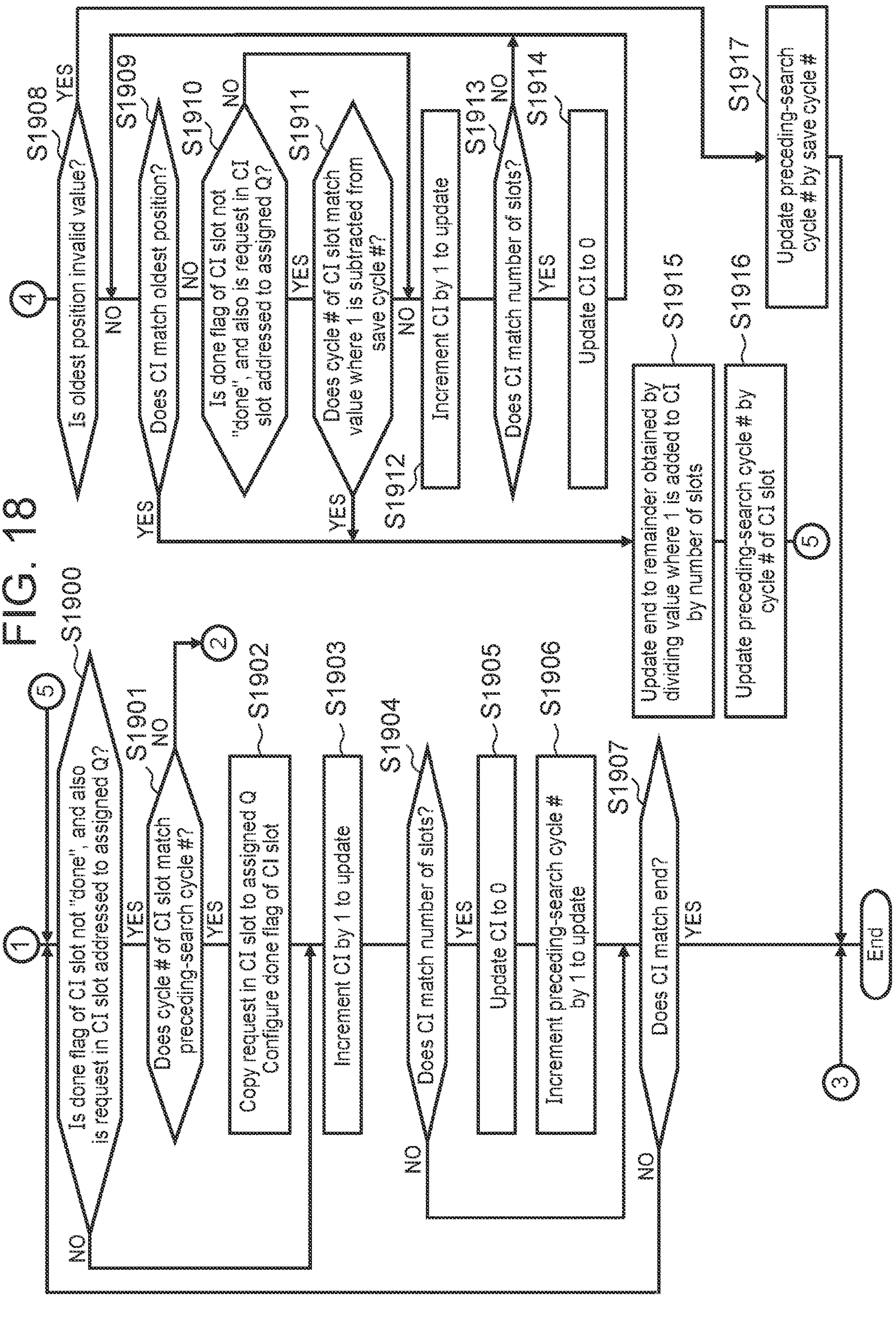
FIG. 18 is a flowchart for describing operations of the MP in the storage system according to the embodiment.

FIGS. 17 and 18 are flowcharts for describing operations of the MP 120 in the storage system 10 according to the embodiment. The operations illustrated in the flowcharts in FIGS. 17 and 18 are executed in increments of MPs 120 by polling control.

First, the MP 120 configures a random invalid value to the oldest position 133*c* in the Consumer-side management table 133 (step S1800). Any value can be used for the invalid value here, as long as it is a value that is impossible as a slot position of this port queue 131. For example, "−1" or the like is suitable. Next, the MP 120 determines whether or not the value of the cycle No. 132*a* in the queue information table 132 corresponding to the slot the CI is pointing to is equal to the preceding-search cycle No. 133*b* in the Consumer-side management table 133 (step S1801). This determination is determination regarding whether the PI has overtaken the CI 133*a*, as described earlier.

If the determination is positive (YES in Step S1801), judgment is made that the PI has not overtaken the CI and the flow advances to step S1802, and if the determination is negative (NO in Step S1801), judgment is made that the PI has overtaken the CI 133*a* and the flow advances to step S1804.

In step S1802, the MP 120 determines whether or not the value of PI is equal to the value of the CI 133*a*. If the determination is positive (YES in Step S1802), judgment is made that a new request has not been stored to a slot of the port queue 131, and the program is quit. Conversely, if the determination is negative (NO in Step S1802), the flow advances to step S1803 (see A in FIG. 4).

In step S1803, the MP 120 configures the value of the end to be equal to the PI. Next, advancing to FIG. 18, the MP 120 determines whether or not the done flag 132*b* of the slot corresponding to the CI 133*a* is cleared, and the Q #corresponding to the request stored in this slot is pointing to the assigned Q (step S1900). If the determination is positive (YES in Step S1900), the flow advances to step S1901, and if the determination is negative (NO in Step S1900), the flow advances to step S1903.

In step S1901, the MP 120 determines whether or not the value of the cycle No. 132*a* of the slot corresponding to the CI 133*a* is equal to the value of the preceding-search cycle No. 133*b*. If the determination is positive (YES in Step S1901), the flow advances to step S1902, and if the determination is negative (NO in Step S1901), judgment is made that at this time point the PI has overtaken the CI 133*a*, and the flow advances to step S1804.

In step S1902, the MP 120 reaps the request stored in the slot that the CI 133*a* is pointing to and copies to the assigned Q, and configures the done flag 132*b* corresponding to the slot that the CI 133*a* is pointing to.

Next, the MP 120 increments the CI 133*a* by 1 (step S1903).

The MP 120 then determines whether or not the value of the CI 133*a* is equal to the number of slots of the port queue 131 (step S1904). As a result, if the determination is positive (YES in Step S1904), judgment is made that the MP 120 has searched to the end of the slots of the port queue 131 and the flow advances to step S1905, and if the determination is negative (NO in Step S1904), judgment is made that searching has not yet been performed to the end, and the flow advances to step S1907.

In step S1905, the MP 120 configures the CI 133*a* to 0, and further increments the preceding-search cycle No. 133*b* by 1 (step S1906).

In step S1907, the MP 120 determines whether or not the value of the end is equal to the value of the CI 133*a*. If the determination is positive (YES in Step S1907), the program is quit, and if the determination is negative (NO in Step S1907), the flow returns to step S1900.

Returning to FIG. 17, in step S1804 the MP 120 configures the value of the tentative end to the value of the CI 133*a*. Next, the MP 120 configures the value of a save cycle No. to the value of the cycle No. 132*a* that corresponds to the slot that the CI 133*a* is pointing to (step S1805).

The MP 120 determines whether or not the done flag 132*b* of the slot corresponding to the CI 133*a* is cleared, and the Q #corresponding to the request stored in this slot is pointing to the assigned Q (step S1806). If the determination is positive (YES in Step S1806), the flow of the program advances to step S1807, and if the determination is negative (NO in Step S1806), the flow advances to step S1811.

Figure 4:
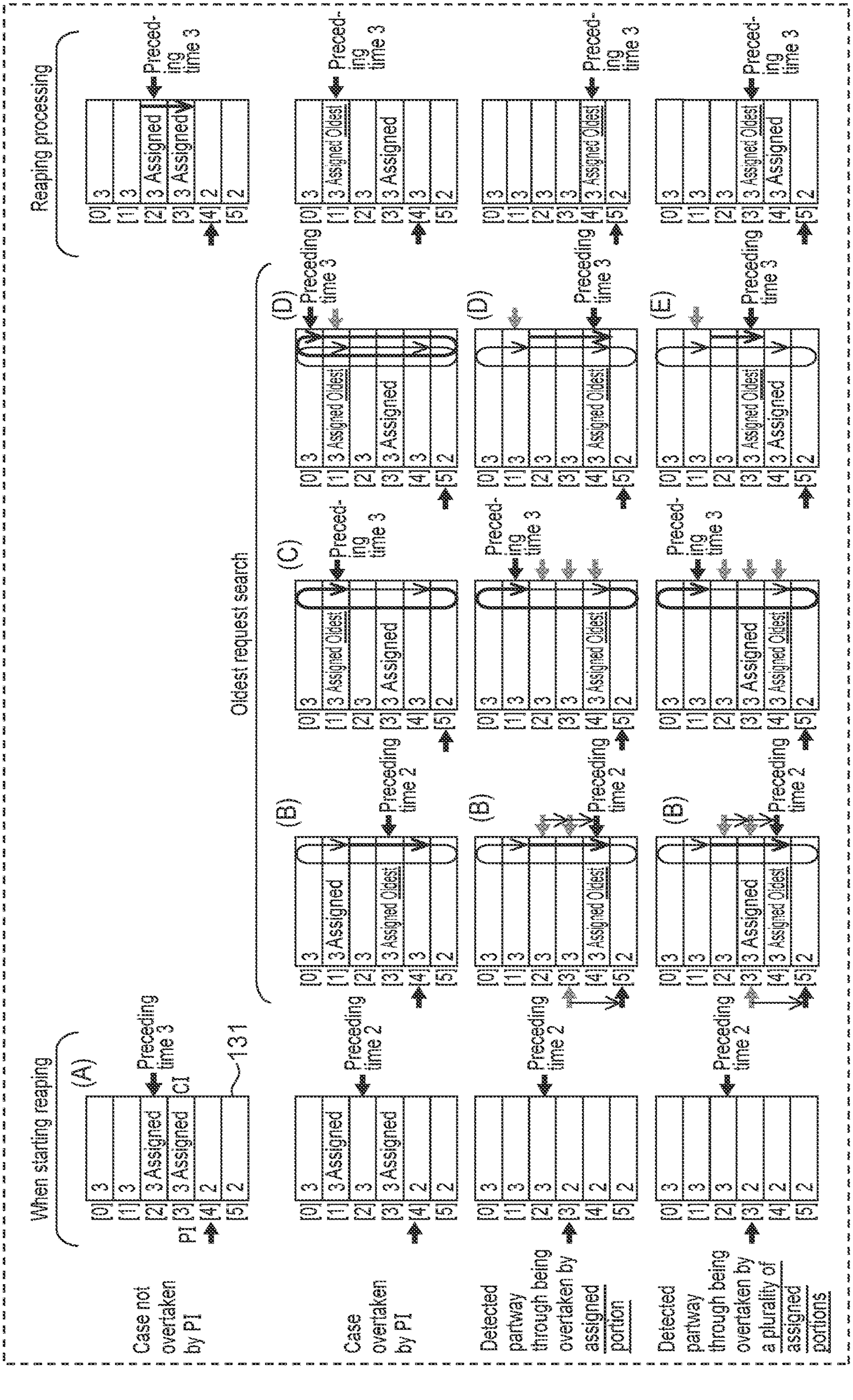
FIG. 4 is a diagram illustrating an overview of reaping operations of a port queue in the storage system according to the embodiment.

In step S1807, the MP 120 determines whether or not the oldest position 133*c* has a valid value (see B in FIG. 4). If the determination is positive (YES in Step S1807), the flow advances to step S1809, and if the determination is negative (NO in Step S1807), the flow advances to step S1808.

In step S1808, the MP 120 determines whether or not the value of the cycle No. 132*a* of the slot corresponding to the CI 133*a* is equal to a value where 1 is subtracted from the value of the save cycle No. If the determination is positive (YES in Step S1808), the flow advances to step S1809, and if the determination is negative (NO in Step S1808), the flow advances to step S1811. Now, the determination being negative here means that the MP 120 has detected a separate request that has the same cycle No. 132*a* as the oldest request stored at that time point. In such a request, the oldest request and the cycle No. 132*a* have the same value, and the request is stored in a slot position of an older No., and thus can be judged to be a newer request than the oldest request. Accordingly, it is appropriate for the MP 120 to disregard this request.

In step S1809, the MP 120 configures the value of the oldest position 133*c* to the value of the CI 133*a*, and further configures the value of the save cycle No. to the value of the cycle No. 132*a* of the slot corresponding to the CI 133*a* (step S1810).

In step S1811, the MP 120 increments the value of the CI 133*a* by 1. Next, the MP 120 determines whether or not the value of the CI 133*a* is equal to the number of slots of the port queue 131 (step S1812). If the determination is positive (YES in Step S1812), the flow advances to step S1813, and if the determination is negative (NO in Step S1812), the flow advances to step S1814.

In step S1813, the MP 120 configures the value of the CI 133*a* to 0.

In step S1814, the MP 120 determines whether or not the value of the tentative end is equal to the value of the CI 133*a*. If the determination is positive (YES in Step S1814), the flow advances to step S1908, and if the determination is negative (NO in Step S1814), the flow returns to step S1806.

Advancing to FIG. 18, in step S1908, the MP 120 determines whether or not the oldest position 133*c* has a valid value. If the determination is positive (YES in Step S1908), the flow advances to step S1917, and if the determination is negative (NO in Step S1908), the flow advances to step S1909.

In step S1909, the MP 120 determines whether or not the value of the CI 133*a* is equal to the value of the oldest position 133*c* (see D in FIG. 4). If the determination is positive (YES in Step S1909), the flow advances to step S1915, and if the determination is negative (NO in Step S1909), the flow advances to step S1910.

In step S1910, the MP 120 determines whether or not the done flag 132*b* of the slot corresponding to the CI 133*a* is cleared, and the Q #corresponding to the request stored in this slot is pointing to the assigned Q for itself. If the determination is positive (YES in Step S1910), the flow of the program advances to step S1911, and if the determination is negative (NO in Step S1910), the flow advances to step S1912.

In step S1911, the MP 120 determines whether or not the value of the cycle No. 132*a* of the slot corresponding to the CI 133*a* is equal to the value of the save cycle No. (see E in FIG. 4). If the determination is positive (YES in Step S1911), the flow advances to step S1915, and if the determination is negative (NO in Step S1911), the flow advances to step S1912.

In step S1912, the MP 120 increments the value of the CI 133*a* by 1.

The MP 120 then determines whether or not the slot corresponding to the CI 133*a* is equal to the number of slots of the port queue 131 (step S1913). As a result, if the determination is positive (YES in Step S1913), judgment is made that the MP 120 has searched the slots of the port queue 131 to the end and the flow advances to step S1914, and if the determination is negative (NO in Step S1913), determination is made that searching has not yet been performed to the end, and the flow returns to step S1909.

In step S1914, the MP 120 configures the CI 133*a* to 0, and the flow returns to step S1909.

In step S1915, the MP 120 takes a value of a modulo operation where a value where 1 is added to the value of the CI 133*a* is divided by the number of the slots of the port queue 131 (i.e., remainder) as the value of the end. Further, the MP 120 configures the value of the preceding-search cycle No. 133*b* to the value of the cycle No. 132*a* of the CI 133*a* (step S1916). Thereafter, the flow advances to step S1900.

In step S1917, the MP 120 configures the value of the preceding-search cycle No. 133*b* to the value of the save cycle No. Thereafter, the program is quit.

Thus, according to the present embodiment, the plurality of MPs 120 can perform reaping operations of requests stored in slots of the port queue 131 completely in parallel, without mutually excluding each other. Accordingly, even in a configuration where the number of MPs 120 is markedly great as compared to the number of higher-order interfaces 11 in the storage system 10, effectiveness due to parallel processing is yielded, and processing capabilities of the storage system 10 can be improved. Also, the order of processing within a range of an optional logical increment to which the requests belong can be ensured.

Note that the above embodiment is a detailed description of configurations, made so that the description of the present invention will be easy to understand, and is not necessarily limited to being provided with all configurations described. Part of the configurations in the embodiment may be added, deleted, or substituted by other configurations.

Part or all of the above configurations, functions, processing units, processing means, and so forth, may be realized by hardware, by designing an integrated circuit, for example, or the like. Also, the present invention can be realized by program code of software that realizes the functions of the embodiment. In this case, a recording medium storing the program code is provided to a computer, and a processor that the computer is provided with reads the program code stored in the storage medium. In this case, the program code itself read from the storage medium realizes the functions of the above-described embodiment, and the program code itself, and the storage medium storing the program code, make up the present invention. Examples of storage media used for supplying such program code include flexible disks, CD-ROM, DVD-ROM, hard disks, SSD (Solid State Drive), optical disks, optomagnetic disks, CD-R, magnetic tape, nonvolatile memory cards, ROM, and so forth.

The program code realizing the functions described in the present embodiment can be implemented by a broad range of programming or scripting languages, such as for example assembly language, C/C++, perl, Shell, PHP, Java (a registered trademark), and so forth.

The control lines and information lines shown in the above embodiment are those thought to be necessary for description, and not necessarily all control lines and information lines in a product are shown. All configurations may be mutually coupled.

What is claimed is:

1. A storage system, comprising:

a plurality of logical devices;

an I/O (Input/Output) controller configured to accept, from a computer, one or more requests specifying any one or more of the plurality of logical devices; and a controller configured to perform processing of the requests with regard to the plurality of logical devices, on a basis of the requests, wherein the controller includes a plurality of processors provided corresponding to the plurality of logical devices, and memory, wherein the memory includes a port queue having slots where a predetermined number of the requests are stored, and virtual queues provided corresponding to the plurality of logical devices, wherein the I/O controller is configured to store the requests from the computer in the port queue, on a basis of an index indicating a slot of the slots which allows subsequent storing, and wherein the processors are each configured to hold pointers of the slots having undergone a preceding search of the port queue by the processors, search the port queue from the slots that the pointers indicate, search for the requests addressed to the respective logical devices to which the processors correspond, and store the requests in the virtual queues corresponding to the logical devices, to process the requests.

2. The storage system according to claim 1, wherein the I/O controller is configured to store the requests in the slots of the port queue following a predetermined order, and wherein the processors are each configured to search the slots of the port queue following the predetermined order.

3. The storage system according to claim 2, wherein the processors are each configured to, in a case where the requests addressed to the respective logical devices to which the processors correspond are not successfully found by searching from the slots that the pointers indicate, search the slots again following a first in the predetermined order.

4. The storage system according to claim 3, wherein the memory is configured to include a queue information table where a cycle No. and a done flag are stored corresponding to each of the slots, wherein the I/O controller is configured to, when storing the requests in the port queue, increment the cycle No. corresponding to each of the slots where the requests are stored by 1, and also perform writing in the queue information table to clear the done flag, and wherein the processors are each configured to, when processing the requests, write the done flag corresponding to each of the slots where the requests have been processed in the queue management table.

5. The storage system according to claim 4, wherein the memory is configured to include a management table storing the cycle No. of each of the slots that the pointers indicate and the cycle No. of each of the slots having undergone the preceding search by the processors, corresponding to each of the processors, and wherein the processors are each configured to, when processing the requests, update the cycle No. of each of the slots indicated by the pointers with the cycle No. corresponding to a corresponding slot of the slots where the requests have been processed, and increment the cycle No. of each of the slots having undergone the preceding search by the processors by 1.

6. The storage system according to claim 5, wherein the processors are each configured to, when processing the requests, compare the cycle No. of each of the slots indicated by the pointers and the cycle No. of each of the slots having undergone the preceding search by the processors, stored in the management table, and when these are not equal, reference the queue information table and search all of the slots of the port queue, search a slot of which the cycle No. is lowest and where a corresponding request of the requests addressed to the respective logical devices to which the processors correspond is stored, and further reference the queue information table and search all of the slots of the port queue again, and search the slot of which the cycle No. is lowest and where the corresponding request of the requests addressed to the respective logical devices to which the processors correspond is stored.

7. The storage system according to claim 1, wherein the processors are each configured to independently search the slots and process the requests at a timing set by the respective processors.

8. The storage system according to claim 1, wherein the I/O controller is configured to store the requests in the port queue independent from searching operations of the slots and processing operations of the requests by the processors.

9. A queue control method in a storage system comprising a controller configured to accept, from a computer, one or more requests specifying any one or more of a plurality of logical devices, and perform processing of the requests with regard to the plurality of logical devices, on a basis of the requests, the controller including a port queue having slots where a predetermined number of the requests are stored, and virtual queues provided corresponding to the plurality of logical devices, and the controller including processors provided corresponding to the logical devices, the method comprising:

holding pointers of the slots having undergone a preceding search of the port queue by the processors;

searching the port queue from the slots that the pointers indicate;

searching for the requests addressed to the respective logical devices to which the processors correspond; and storing the requests in the virtual queues corresponding to the logical devices, to process the requests.

* * * * *